US006430171B1

(12) United States Patent
Ogami et al.

(10) Patent No.: US 6,430,171 B1
(45) Date of Patent: Aug. 6, 2002

(54) RECEIVER APPARATUS FOR A RANDOM ACCESS CHANNEL OF A CDMA MOBILE COMMUNICATION SYSTEM

(75) Inventors: Tadashi Ogami; Yoshihiro Unno, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/361,119

(22) Filed: Jul. 27, 1999

(30) Foreign Application Priority Data

Jul. 28, 1998 (JP) .......................................... 10-212825

(51) Int. Cl.$^7$ ............................................... H04B 7/216
(52) U.S. Cl. ........................ 370/342; 370/350; 370/503
(58) Field of Search ................................. 370/208, 209, 370/328, 329, 335, 342, 350, 441, 503, 514; 455/442, 522

(56) References Cited

U.S. PATENT DOCUMENTS 6,038,450 A * 3/2000 Brink et al. ................ 455/442
6,119,018 A * 9/2000 Kondo ........................ 455/522

FOREIGN PATENT DOCUMENTS

| JP | 9-271071 | 10/1997 |
| JP | 10-51424 | 2/1998 |

* cited by examiner

*Primary Examiner*—Nguyen T. Vo
*Assistant Examiner*—Nghi Ly
(74) *Attorney, Agent, or Firm*—Sughrue Mion, PLLC

(57) ABSTRACT

A random access channel receiver used in a base station of a CDMA mobile communication system is provided. The receiver is only provided with a single signal decoding part for performing burst reception of control request signals having different off-set timing each other. A synchronizing circuit calculates correlation value at each off-set timing, and a synchronism determining and establishing circuit determines the off-set timing to be used for a synchronizing signal for receiving the signal frame currently arriving by monitoring correlation values of respective off-set timings, and alters the off-set timing for the synchronizing signal to better quality of signal if a plurality of signal frames of different off-set timing are arrived. The signal frame of less quality is discarded, or abandoned its decoding processing.

5 Claims, 6 Drawing Sheets

RECEIVER APPARATUS FOR A RANDOM ACCESS CHANNEL OF A CDMA MOBILE COMMUNICATION SYSTEM

BACKGROUND OF THE INVENTION

1. Field of the Invention

The present invention relates to a receiving apparatus used for a random access channel of a mobile communication system, and more particular, to a random access channel receiver in a base station of a code division multiple access (CDMA) mobile communication system.

2. Description of the Related Art

A random access channel is provided between a base station and a mobile terminal for conveying various kind of control request signals from the mobile terminal at random basis. A call request signal at the time of call origination by the mobile terminal, a hand-off request signal during communication, and a location registration request signal when detecting new radio area during movement are some examples of control request signals transmitted by the mobile terminal. A random access channel is commonly used by a plurality of mobile terminals, and a random access channel receiver in the base station is used for receiving control request signals on the random access channel transmitted from a plurality of mobile terminals which request the foregoing control operations.

FIG. 1 is a block diagram showing a random access channel receiver used in the base station of the CDMA mobile communication system. Control request signals transmitted by mobile terminals 1, 2 are received by a base station 3. Each signal is passed through a RF (radio frequency) amplifier 31, a frequency converter 32, and input to a signal decoding unit 33 (,conversion of an analogue signal to a digital signal is performed before inputting the signal to the signal decoding unit 33). In the signal decoding unit, the received signal is demodulated by a specific spread code and output to an information demodulator 34. Information of the signal is obtained by demodulating the signal by the information demodulator 34.

FIG. 5 is a block diagram showing the signal decoding unit of the conventional random access channel receiver.

As shown in FIG. 6, the signal decoding unit consists of a plurality of signal decoding parts 601–60N provided for each off-set timing of received signal from the mobile terminal. off-set timings are provided because the random access channel is commonly used by a plurality of mobile channels which means the same spread code is used by all mobile terminals, and if no countermeasures is considered, the signal on the random access channel is interfered each other. Therefore, an intentional delay (or shift) of a few symbols is applied as an off-set timing, and 4–16 off-set timings, depending on the mobile communication system, are provided for the random access channel. When the mobile terminal transmits the control request signal on the random access channel, the mobile terminal selects one of the off-set timings. Then, the base station can discriminate each signal by establishing synchronization.

Backed to FIG. 6, the signal decoding unit of the conventional random access channel receiver is provided with a plurality of signal decoding parts, each establishes synchronization with each off-set timing independently. The signal decoding part 601 comprises a received data accumulating memory 61 for receiving signals from the frequency converter; a synchronism establishing circuit 62 for establishing synchronization with predetermined off-set timing and delivering a synchronizing signal; a correlator 63 for demodulating (or de-spreading) the received signal in the received data accumulating memory 61 by the specific spread code for the random access channel on the basis of the synchronizing signal from the synchronism establishing circuit 62; and a decoding circuit 64 for decoding the output of the correlator 63 and outputting decoded signals to the information demodulator.

As described above, the conventional random access channel receiver should be provided with a plurality of signal decoding parts for each of off-set timings. The reason is that, the time range for establishing synchronization is set to be very short relative to a signal frame for the purpose of preserving a real time operation feature, and it is accordingly difficult for a single signal decoding part to cope with a plurality of off-set timings varying on a frame-by-frame basis.

SUMMARY OF THE INVENTION

An object of the present invention is to provide, in view of the difficulties of the conventional random access channel receiver, a random access channel receiver with a single signal decoding part for performing burst reception of control request signals having different off-set timing each other.

A receiving apparatus for a random access channel in a base station of a CDMA mobile communication system, which receives a plurality of signal frames with a respective off-set timing transmitted by a plurality of mobile terminals, the receiving apparatus comprises a synchronizing circuit, a synchronism determining and establishing circuit and a correlator.

The synchronizing circuit calculates and outputs each correlation value at each off-set timing.

The synchronism determining and establishing circuit determines and outputs a synchronizing signal indicating an off-set timing, whose correlation value exceeds a predetermined threshold value, and is higher than any other correlation values corresponding to other off-set timings provided for this mobile communication system.

The correlator demodulates each signal frame being arrived by a predetermined spreading code for the random access channel in accordance with a synchronizing timing instructed by the synchronizing signal output from the synchronism determining and establishing circuit.

In more detail, the synchronizing circuit receives a plurality of signal frames being arrived, calculates a correlation value between each signal frame and a predetermined synchronization word at each off-set timing, and outputs the calculated correlation value for each off-set timing; and a synchronism determining and establishing circuit determines an off-set timing, corresponding correlation value exceeds a predetermined threshold value, as a synchronizing signal, and outputs the synchronizing signal, and when the correlation value of the succeeding off-set timing indicates a higher correlation value, it resets the synchronizing signal to new synchronizing signal. Therefore, the correlator, which performs demodulation operation for each signal frame being arrived by a predetermined spreading code for the random access channel with the synchronizing signal, abandons the demodulation operation for a signal frame being demodulated and initializes the demodulation operation by new synchronizing signal when the synchronism determining and establishing circuit has reset the synchronizing signal.

This makes possible to receive a plurality of signal frames each having different off-set timing with a single decoding part, and enables the receiving apparatus to be reduced in scale.

DETAILED DESCRIPTION OF PREFERRED EMBODIMENTS

Figure 2:
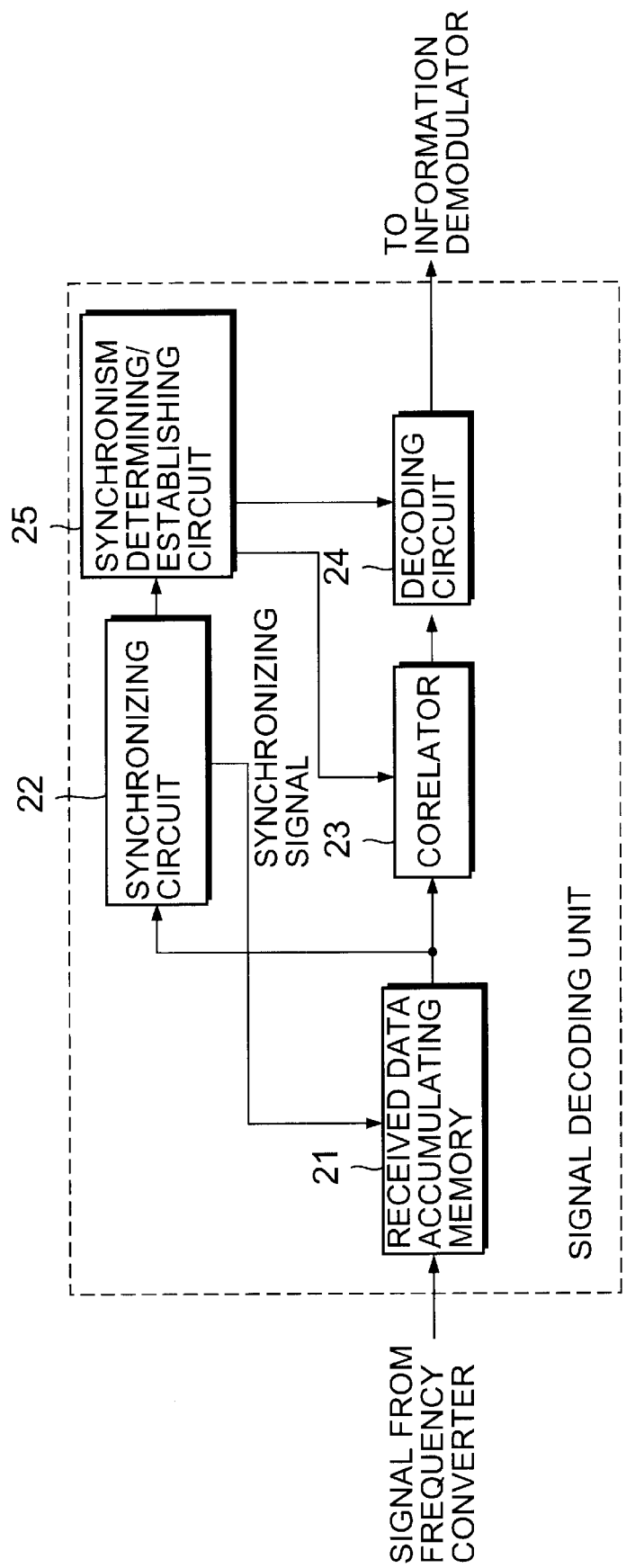
FIG. 2 is a block diagram showing the configuration of a signal decoding part of the random access channel receiver according to the present invention.

An embodiment of the present invention will be described with reference to drawings. FIG. 2 is a block diagram showing the configuration of the signal decoding unit of the random access channel receiver according to the present invention.

Figure 1:
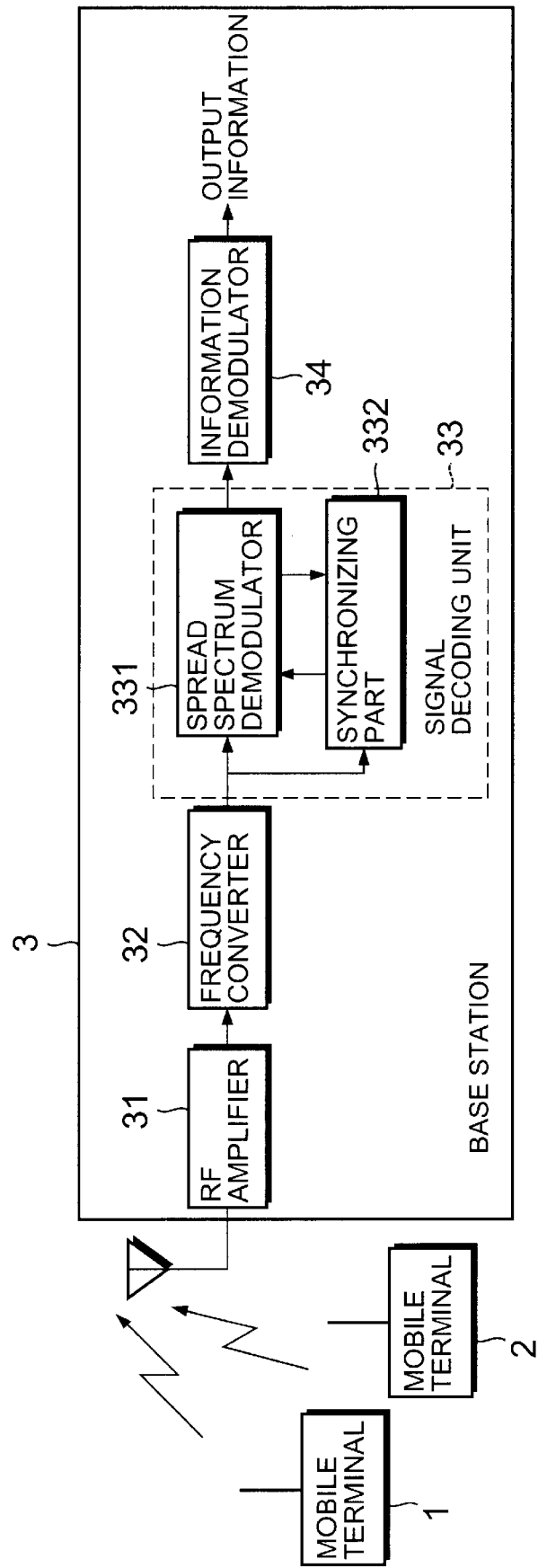
FIG. 1 is a block diagram showing the configuration of a random access channel receiver in the base station.

As shown in FIG. 2, a random access channel receiver of this embodiment is provided with a received data accumulating memory 21 for receiving signals from the frequency converter 32 of FIG. 1; a synchronizing circuit 22 for obtaining correlation between a data stream (or a signal frame) received from the received data accumulating memory 21 and a predetermined spread code SW (synchronization word) which is provided for detecting synchronism establishment, and outputting obtained correlation value; a synchronism determining and establishing circuit 25 for generating a synchronizing signal according to the result of obtained correlation output from the synchronizing circuit 22; a correlator 23 for demodulating (or de-spreading) the received data from the received data accumulating memory 21 with the specific spread code for the random access channel on the basis of the synchronizing signal, which is the output of the synchronism determining and establishing circuit 25; and a decoding circuit 24 for decoding output signals from the correlator and outputting signals to the information demodulator 34 of FIG. 1.

The received data accumulating memory 21 accumulates received signal frames, and outputs signal frames, having the off-set timing designated by the synchronizing signal, to the correlator 23.

The synchronizing circuit 22, obtaining correlation between a data stream output from the accumulating memory 21 and the predetermined spread code SW at each of off-set timings, and outputs the obtained correlation value to the synchronism determining and establishing circuit 25.

The correlator 3, achieving synchronism with the synchronizing signal from the synchronism determining and establishing circuit 25, de-spreads the received data with the specific spread code for the random access channel, and outputs to the decoding circuit 24 as correlation values on a symbol-by-symbol basis. The symbol means each signal waveform represented by "0" or "1".

The decoding circuit 24, taking phase shifts from transmitted signals and the like into account, decodes signals on the basis of the correlation value output of the correlator 23, and outputs them as decoded signals.

The synchronism determining and establishing circuit 25 monitors the correlation value output from the synchronizing circuit 22, and outputs the synchronizing signal for each signal frame to the accumulating memory 21, the correlator 23 and the decoding circuit 24. When a plurality of signals are received at the same time (burst received signals), the synchronism determining and establishing circuit 25 compares each of correlation values, and if a signal having a better correlation value is appeared, resets the synchronizing signal to the better quality signal.

Here, this receiver being intended for receiving burst frames by a single decoding part, a signal having better quality is given priority over other signals having arrived at the same time. Therefore, other signals having less priority are discarded. Although this condition, there is no problem because signals being handled are control signals and the control signal is repeatedly transmitted by a mobile terminal until receiving an accepted signal from a base station.

Figure 3:
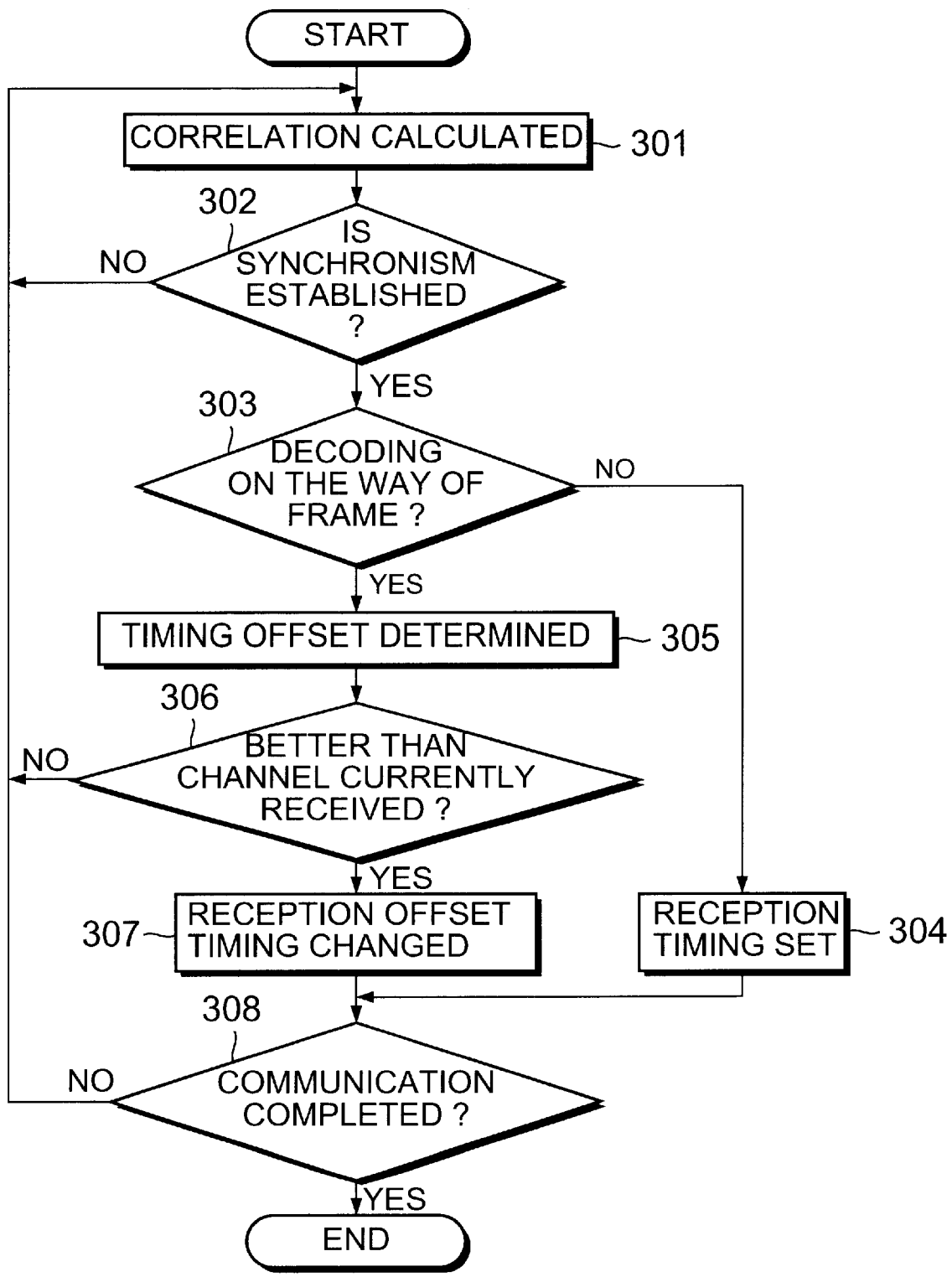
FIG. 3 is a flow chart for showing the procedures of synchronism determination and establishment processing in this embodiment.
Figure 4:
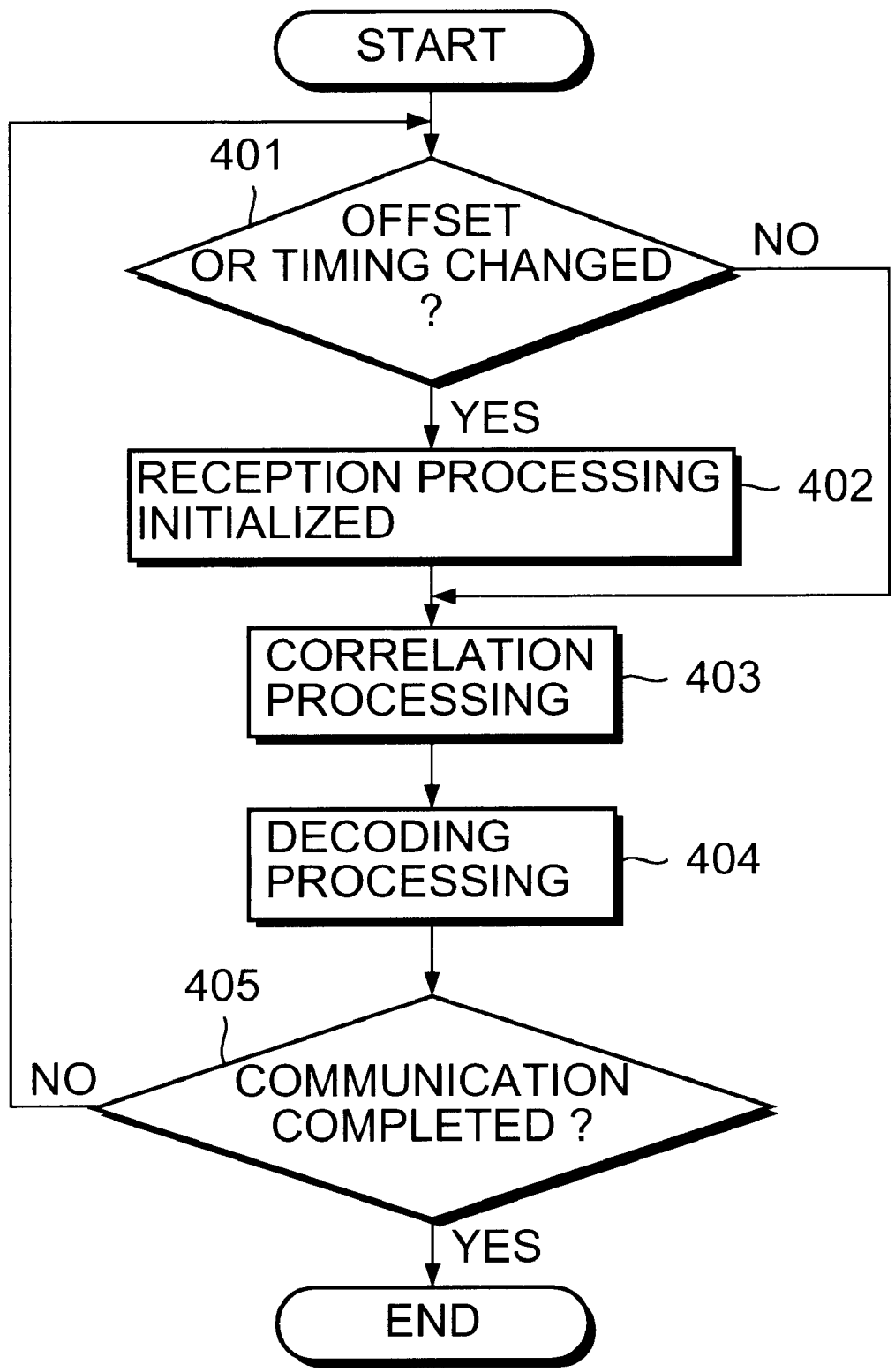
FIG. 4 is a flow chart for showing the procedures of decoding processing in this embodiment.

The operation of this embodiment will be described in detail with reference to drawings. FIG. 3 is a flow chart for showing the procedures of synchronism determination and establishment in this embodiment; FIG. 4, a flow chart showing the procedures of decoding processing in this embodiment; and FIG. 5, a diagram showing signal frames to be received and their respective arrival timings, intended for description of the operation of this embodiment.

Figure 5:
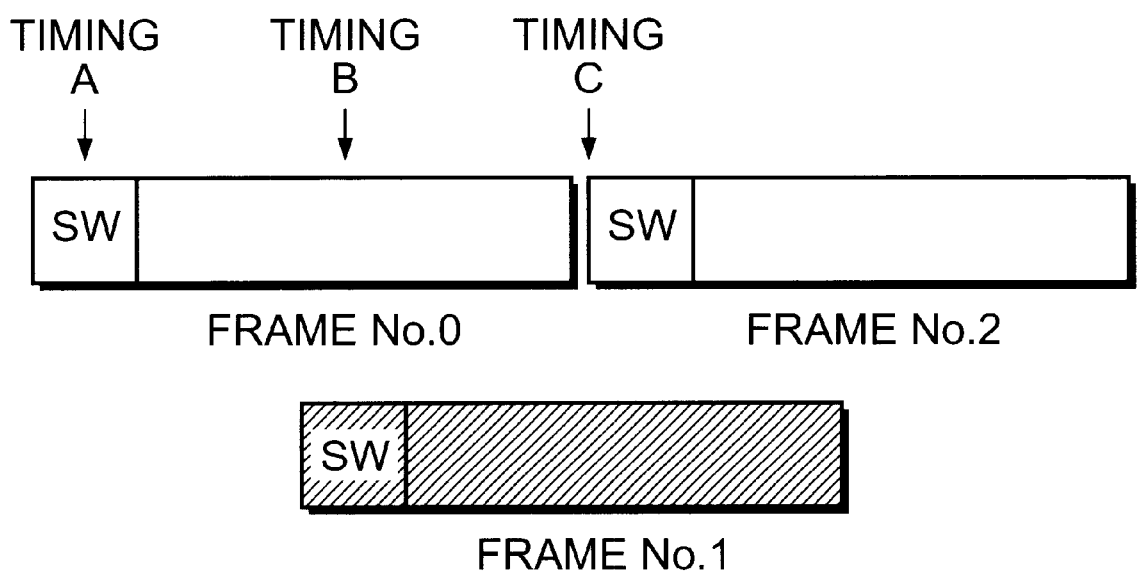
FIG. 5 is a diagram showing signal frames to be received and their respective arrival timings, intended for description of the operation of this embodiment.
Figure 6:
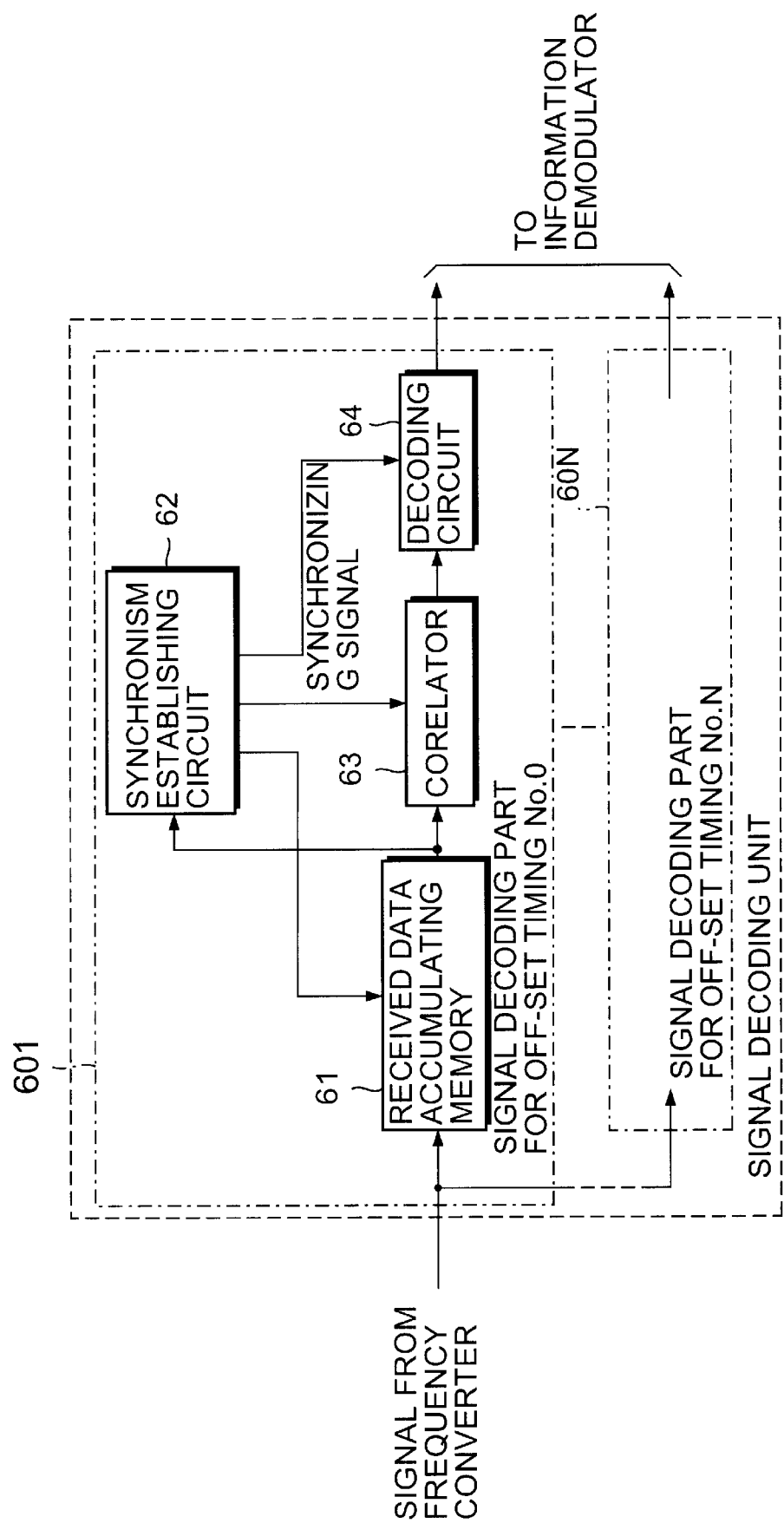
FIG. 6 is a block diagram showing the configuration of a signal decoding unit, which comprises a plurality of signal decoding parts, of the conventional random access channel receiver.

Signals arrived at the signal decoding unit are accumulated in the received data accumulating memory 21 by each signal frame basis. Signal frames are first input to the synchronizing circuit 22. The synchronizing circuit 22 performs calculation of correlation values between a received data stream and the predetermined spread code SW at the beginning of each off-set timing provided in this mobile communication system (step 301). In each signal frame, the SW is attached for indicating the beginning of the frame as shown in FIG. 5. Therefore, large correlation value is calculated when a signal frame of the off-set timing has arrived.

More specifically, supposing that the signal frame No. 0 having the off-set timing A has arrived as shown in FIG. 5, the result of calculation of the correlation value for the off-set timing A obtains a large correlation value. If no signal frame or a signal frame having other off-set timing is there, only a very small correlation value is obtained. The synchronizing circuit 22 calculates and outputs correlation value at each off-set timing provided in this system like this manner, and repeats the calculation. Therefore, calculation of the correlation value for each off-set timing is performed periodically.

In the synchronism determining and establishing circuit 25, the correlation value output from the synchronizing circuit 22 for each off-set timing is compared with predetermined threshold value. If the correlation value exceeds the threshold value, a synchronism is determined for the off-set timing, and the synchronization is established with the off-set timing (step 302: yes). If there is no other signal frames having different off-set timings, the synchronization timing is output to the received data accumulating memory 21, the correlator 23 and the decoding circuit 24 for performing decoding operation for signal frame of the determined off-set timing (step 304).

On the other hand, if a signal frame having different off-set timing has also arrived during decoding operation for the signal frame of the previous off-set timing being performed, the following procedures are carried out.

Referring to FIG. 5, assuming that synchronism with the off-set timing A has been established and decoding operation for the signal frame No. 0 being performed in the received data accumulating memory 21, the correlator 23 and the decoding circuit 24, and during that, the signal frame No. 1 having the off-set timing B has appeared.

In the synchronism determining and establishing circuit 25, the correlation value for the off-set timing B exceeds the threshold value due to arriving the signal frame No. 1, a synchronism is also determined for the off-set timing B. However, in this case, decoding operation for other signal frame is on the way (step 303: yes). Therefore, the synchronism determining and establishing circuit 25 compares correlation value of each signal frame each other (the correlation value of the signal frame No. 0 has been memorized in the synchronism determining and establishing circuit 25). As the result of the comparison, the off-set timing having a larger correlation value is selected. This is based on a concept that a signal frame having larger correlation value is in a better radio condition and priority should be given to better quality communication.

In this comparison, if the signal frame No. 0 is selected, the decoding operation for this signal frame is continued, and the signal frame No. 1 is ignored and discarded (step 306: no). If the signal frame No. 1 is selected, new timing for the off-set timing B is set as the synchronizing signal (step 307), and decoding operation for the signal frame No. 1 is commenced, on the other hand, the decoding operation for the signal frame No. 0 is abandoned.

In either case, discarded signal frame No. 1 or abandoned signal frame No. 0 will be retransmitted from respective mobile terminal later because of no reception of a request accepted signal from the base station within a predetermined timing.

With referring to FIG. 4, the overall operation will be described. The received data accumulating memory 21 and the correlator 23 start de-spreading processing for the signal frame No. 0 in accordance with a designated offset timing A (step 401: no). The received data accumulating memory 21 outputs the signal frame in the timing designated by the synchronizing signal.

The correlator 3 performs, with the synchronizing signal as trigger, de-spreading operation for the signal frame received from the received data accumulating memory 21 using the specific spread code for the random access channel synchronizing with the timing designated by the synchronizing signal, and generates correlation value data on a symbol-by-symbol basis, and outputs them to the decoding circuit 24 (step 403).

The decoding circuit 24, as the correlator 3 does, starts decoding processing with the synchronizing signal as trigger. First, using the predetermined code SW attached to the beginning of the signal frame, it calculates the phase shift between the transmitted signals and the received data, and corrects the received data. It further performs decoding with respect to error correction processing, and outputs the decoded signals (step 404).

The series of above described processing is continuously accomplished until reception processing is completed (step 405).

When the synchronism determining and establishing circuit 25 instructed the different synchronizing signal due to the reason described above (step 401: yes), the reception processing for the signal frame No. 0 having been performed so far is abandoned and initialized (step 402), and the reception processing for the signal frame No. 1 by new synchronizing signal will be commenced.

As hitherto described, according to the present invention, the synchronizing circuit calculates correlation value at each off-set timing, and the synchronism determining and establishing circuit determines the off-set timing to be synchronized for receiving the signal frame currently arriving by monitoring correlation values of respective off-set timings, and alters the off-set timing for synchronizing signal to better quality of signal if a plurality of signal frames of different off-set timing are arrived. By those arrangement, the present invention has a capable of receiving a plurality of signal frames having different off-set timing with a single signal decoding part. As a result, the receiving apparatus used for a random access channel of the CDMA mobile communication system can be reduced in scale.

What is claimed is:

1. A receiving apparatus for a random access channel in a base station of a code division multiple access (CDMA) mobile communication system, which receives a plurality of signal frames with a respective off-set timing transmitted by a plurality of mobile terminals, said apparatus comprising;

a synchronizing circuit, which calculates and outputs each correlation value at each off-set timing;

a synchronism determining and establishing circuit, which determines and outputs a synchronizing signal indicating an off-set timing, whose correlation value exceeds a predetermined threshold value, and is higher than any other correlation values corresponding to other off-set timings provided for this mobile communication system; and a correlator, which demodulates each signal frame being arrived by a predetermined spreading code for the random access channel in accordance with a synchronizing timing instructed by the synchronizing signal output from the synchronism determining and establishing circuit.

2. A synchronizing circuit according to claim 1, wherein, the synchronizing circuit, which receives a plurality of signal frames being arrived, calculates a correlation value between each signal frame and a predetermined synchronization word at each off-set timing, and outputs the calculated correlation value for each off-set timing.

3. A receiving apparatus for a random access channel in a base station of a code division multiple access (CDMA) mobile communication system, which receives a plurality of signal frames with a respective off-set timing transmitted by a plurality of mobile terminals, said apparatus comprising;

a synchronizing circuit, which receives a plurality of signal frames being arrived, calculates a correlation value between each signal frame and a predetermined synchronization word at each off-set timing, and outputs the calculated correlation value for each off-set timing;

a synchronism determining and establishing circuit, which determines an off-set timing whose correlation value, received from the synchronization circuit, exceeds a predetermined threshold value as a synchronizing signal, and outputs a synchronizing signal indicating the determined off-set timing; and a correlator, which demodulates each signal frame being arrived by a predetermined spreading code for the random access channel with the synchronizing signal output from the synchronism determining and establishing circuit.

4. A synchronism determining and establishing circuit according to claim 3, wherein, the synchronism determining and establishing circuit comprising;
   a control part, which determines an off-set timing whose correlation value, received from the synchronization circuit, exceeds a predetermined threshold value as a synchronizing signal, and outputs a synchronizing signal indicating the determined off-set timing, and resets the synchronizing signal to another synchronizing signal when the correlation value of the succeeding off-set timing indicates a higher correlation value.

5. A correlator according to claim 4, wherein, the correlator comprising;
   a control part, which performs demodulation operation for each signal frame being arrived by a predetermined spreading code for the random access channel with the synchronizing signal output from the synchronism determining and establishing circuit, and abandons the demodulation operation for a signal frame being demodulated and initializes the demodulation operation by new synchronizing signal when the synchronism determining and establishing circuit has reset the synchronizing signal.

* * * * *